US012657231B2

(12) United States Patent
Jeong et al.

(10) Patent No.: US 12,657,231 B2
(45) Date of Patent: *Jun. 16, 2026

(54) NATURAL LANGUAGE INFERENCING AND DEEP LEARNING-BASED GROUPING OF UNLABELED TEXT

(71) Applicant: Nasdaq, Inc., New York, NY (US)

(72) Inventors: Hyunsoo Jeong, Edgewater, NJ (US); Yongheng Zhang, Chelsea, MA (US); Yu-Hsuan Jou, Somerville, MA (US)

(73) Assignee: NASDAQ, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/964,875

(22) Filed: Dec. 2, 2024

(65) Prior Publication Data

US 2025/0094477 A1 Mar. 20, 2025

Related U.S. Application Data

(63) Continuation of application No. 18/087,329, filed on Dec. 22, 2022, now Pat. No. 12,189,672.

(51) Int. Cl.
*G06F 16/353* (2025.01)
*G06N 20/20* (2019.01)

(52) U.S. Cl.
CPC .......... *G06F 16/353* (2019.01); *G06N 20/20* (2019.01)

(58) Field of Classification Search
CPC ...... G06F 16/353; G06N 20/20; G06N 3/044; G06N 3/045; G06N 3/08
See application file for complete search history.

(56) References Cited

U.S. PATENT DOCUMENTS

| | | | |
|---|---|---|---|
| 10,438,264 B1 * | 10/2019 | Viswanathan | ........... G06N 5/04 |
| 11,323,570 B1 | 5/2022 | Lamba | |
| 2002/0115048 A1 | 8/2002 | Meimer | |
| 2015/0095267 A1 | 4/2015 | Behere | |
| 2016/0162814 A1 | 6/2016 | Breedvelt-Schouten | |
| 2023/0351102 A1 | 11/2023 | Tran | |

FOREIGN PATENT DOCUMENTS

JP         2023182707 A    12/2023

* cited by examiner

*Primary Examiner* — Khanh B Pham
*Assistant Examiner* — Kweku William Halm
(74) *Attorney, Agent, or Firm* — Nixon & Vanderhye, PC

(57) ABSTRACT

Systems and methods that provide improved (e.g., higher accuracy and time-efficient) aggregation of report data are described. Example embodiments effectively combine machine learning and deep learning in a processing pipeline to classify unlabeled source data to determine a reliable classification, or a labeling, of that source data. The classified or labeled source data can be used to generate reports that provide extensive insight into the aggregated source data.

18 Claims, 9 Drawing Sheets

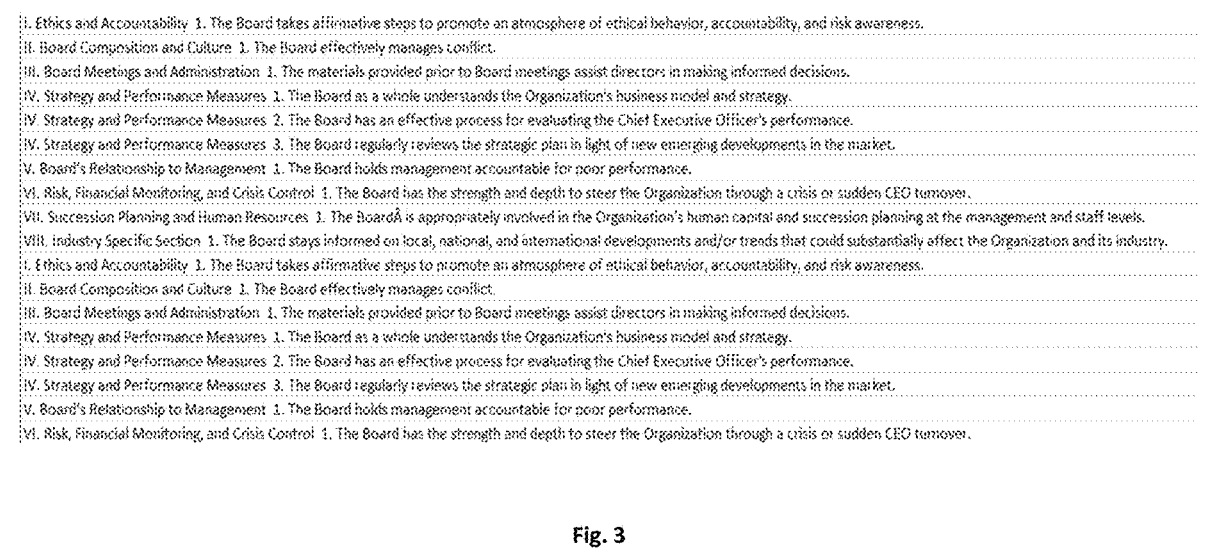

I. Ethics and Accountability  1. The Board takes affirmative steps to promote an atmosphere of ethical behavior, accountability, and risk awareness.

II. Board Composition and Culture  1. The Board effectively manages conflict.

III. Board Meetings and Administration  1. The materials provided prior to Board meetings assist directors in making informed decisions.

IV. Strategy and Performance Measures  1. The Board as a whole understands the Organization's business model and strategy.

IV. Strategy and Performance Measures  2. The Board has an effective process for evaluating the Chief Executive Officer's performance.

IV. Strategy and Performance Measures  3. The Board regularly reviews the strategic plan in light of new emerging developments in the market.

V. Board's Relationship to Management  1. The Board holds management accountable for poor performance.

VI. Risk, Financial Monitoring, and Crisis Control  1. The Board has the strength and depth to steer the Organization through a crisis or sudden CEO turnover.

VII. Succession Planning and Human Resources  1. The Board is appropriately involved in the Organization's human capital and succession planning at the management and staff levels.

VIII. Industry Specific Section  1. The Board stays informed on local, national, and international developments and/or trends that could substantially affect the Organization and its industry.

I. Ethics and Accountability  1. The Board takes affirmative steps to promote an atmosphere of ethical behavior, accountability, and risk awareness.

II. Board Composition and Culture  1. The Board effectively manages conflict.

III. Board Meetings and Administration  1. The materials provided prior to Board meetings assist directors in making informed decisions.

IV. Strategy and Performance Measures  1. The Board as a whole understands the Organization's business model and strategy.

IV. Strategy and Performance Measures  2. The Board has an effective process for evaluating the Chief Executive Officer's performance.

IV. Strategy and Performance Measures  3. The Board regularly reviews the strategic plan in light of new emerging developments in the market.

V. Board's Relationship to Management  1. The Board holds management accountable for poor performance.

VI. Risk, Financial Monitoring, and Crisis Control  1. The Board has the strength and depth to steer the Organization through a crisis or sudden CEO turnover.

Fig. 3

The Board regularly provides the Chief Executive Officer with candid feedback on his performance.
The Board regularly reviews the strategic plan in light of new/emerging developments in the market.
The Board regularly reviews the strategic plan in light of new/emerging developments in the market.
The Board regularly reviews the strategic plan in light of new/emerging developments in the market.
The Board regularly reviews the strategic plan in light of new emerging developments in the market.
The Board effectively monitors the implementation of strategy.
Board members are afforded sufficient opportunity to provide meaningful input to strategic planning.
Board members are afforded sufficient opportunity to provide meaningful input to strategic planning.
Board members are afforded sufficient opportunity to provide meaningful input to strategic planning.
Board members are afforded sufficient opportunity to provide meaningful input to strategic planning.
The Board receives adequate progress reports from management regarding the implementation of Board decisions.Â
The Board receives adequate progress reports from management regarding the implementation of Board decisions.
The Board receives adequate progress reports from management regarding the implementation of Board decisions.
Board meetings devote sufficient time to discussion of strategy.
The Board has a positive, interactive working relationship with management.
The Board has a positive, interactive working relationship with management.
The Board has a positive, interactive working relationship with management.
The Board has a positive, interactive working relationship with management.
The Board has made its expectations regarding performance explicit to management.
The Board has made its expectations regarding performance explicit to management.
The Board holds management accountable for poor performance.
The Board holds management accountable for poor performance.
The Board provides management with an appropriate amount of autonomy.
The Board provides management with an appropriate amount of autonomy.
Management feels comfortable disclosing mistakes it has made to the Board.
Management makes clear and transparent decisions.
Management makes clear and transparent decisions.
Management makes clear and transparent decisions.
The Board has a clear understanding of what the CEO expects from it and how each member can support him/her.
The Board has a clear understanding of what the CEO expects from it and how each member can support him.

Fig. 4

| | year | sents | section | question | report_min | report_max | report_mean | full_question | question_cleaned |
|---|---|---|---|---|---|---|---|---|---|
| 0 | 2017 | I. Ethics and Accountability 1. The Board take... | I. Ethics and Accountability | The Board takes affirmative steps to promote a... | 8.0 | 10.0 | 9.4 | I. Ethics and Accountability: The Board takes ... | ethics accountability board takes affirmative ... |
| 1 | 2017 | II. Board Composition and Culture 1. The Board... | II. Board Composition and Culture | The Board effectively manages conflict. | 7.0 | 10.0 | 8.2 | II. Board Composition and Culture: The Board e... | board composition culture board effectively ma... |
| 2 | 2017 | III. Board Meetings and Administration 1. The ... | III. Board Meetings and Administration | The materials provided prior to Board meetings... | 5.0 | 10.0 | 8.8 | III. Board Meetings and Administration: The ma... | board meetings administration materials provid... |
| 3 | 2017 | IV. Strategy and Performance Measures 1. The B... | IV. Strategy and Performance Measures | The Board as a whole understands the Organizat... | 5.0 | 10.0 | 8.3 | IV. Strategy and Performance Measures: The Boa... | strategy performance measures board whole unde... |
| 4 | 2017 | 2. The Board has an effective process for eval... | IV. Strategy and Performance Measures | The Board has an effective process for evaluat... | 6.0 | 10.0 | 8.6 | IV. Strategy and Performance Measures: The Boa... | strategy performance measures board effective ... |

Fig. 5

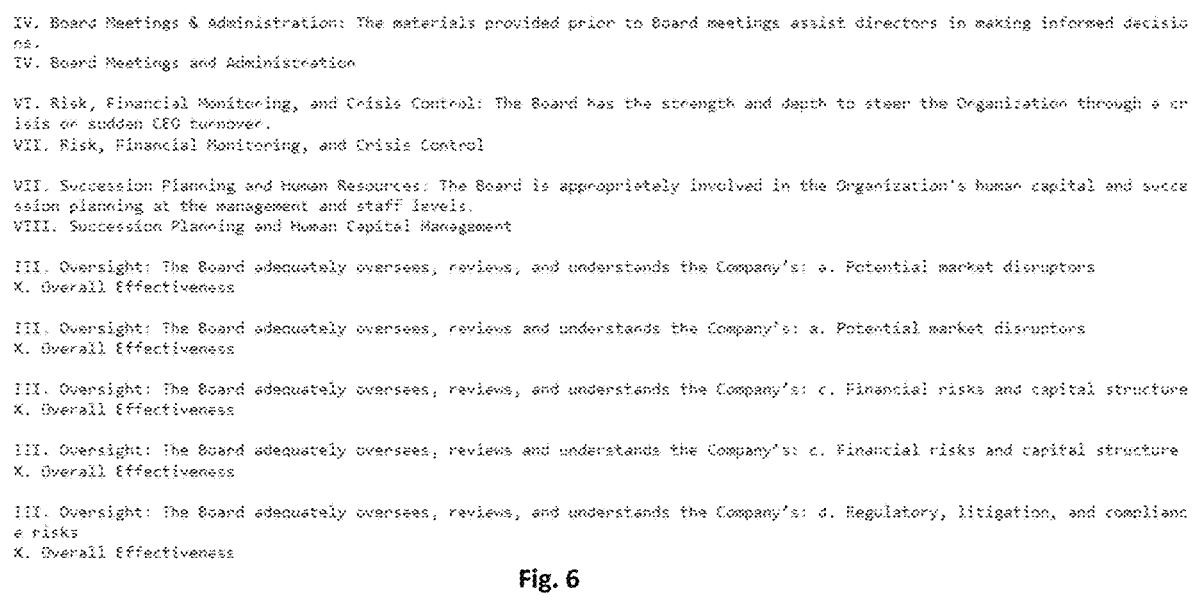

IV. Board Meetings & Administration: The materials provided prior to Board meetings assist directors in making informed decisions.
IV. Board Meetings and Administration VI. Risk, Financial Monitoring, and Crisis Control: The Board has the strength and depth to steer the Organization through a crisis or sudden CEO turnover.
VII. Risk, Financial Monitoring, and Crisis Control VII. Succession Planning and Human Resources: The Board is appropriately involved in the Organization's human capital and succession planning at the management and staff levels.
VIII. Succession Planning and Human Capital Management III. Oversight: The Board adequately oversees, reviews, and understands the Company's: a. Potential market disruptors
X. Overall Effectiveness III. Oversight: The Board adequately oversees, reviews and understands the Company's: a. Potential market disruptors
X. Overall Effectiveness III. Oversight: The Board adequately oversees, reviews, and understands the Company's: c. Financial risks and capital structure
X. Overall Effectiveness III. Oversight: The Board adequately oversees, reviews and understands the Company's: c. Financial risks and capital structure
X. Overall Effectiveness III. Oversight: The Board adequately oversees, reviews, and understands the Company's: d. Regulatory, litigation, and compliance risks
X. Overall Effectiveness

Fig. 6

NATURAL LANGUAGE INFERENCING AND DEEP LEARNING-BASED GROUPING OF UNLABELED TEXT

CROSS REFERENCE(S) TO RELATED APPLICATION(S)

This application is a continuation of U.S. application Ser. No. 18/087,329, filed Dec. 22, 2022.

TECHNICAL OVERVIEW

The technology described herein relates to artificial intelligence-based systems and methods for reporting from document corpuses. More particularly, the technology described herein relates to combining machine learning and deep learning artificial intelligence frameworks to group unlabeled data from one or more data corpuses.

INTRODUCTION

The increasing proliferation of large and dynamic collections of data and increasingly sophisticated requirements for data-driven decisions and actions require techniques for efficiently maintaining consistency among different data regarding the same or similar subjects across many data collections. By ensuring consistency of data that relate to the same or similar subjects across many data collections relating to entities, more consistent and accurate actions, decisions, reporting etc., across entities and over varying time periods can be based on that underlying data.

For ensuring such consistency, efficient techniques are needed to discover data relating to the same or similar subject in all relevant data collections. It is also important, while such consistency is maintained, to accommodate changes to the data collections. Moreover, it is important to provide for evaluating changes in certain data over time with respect to a particular entity, or a collection of entities.

Accordingly, it will be appreciated that new and improved techniques, systems, and processes for efficiently ensuring consistency of data across data collections are continually sought after.

SUMMARY OF EXAMPLE EMBODIMENTS

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIG. 3 shows an example of an input to the preprocessing pipeline segment in the system of FIG. 1, in accordance with some embodiments;

FIG. 4 shows an example output from the preprocessing pipeline segment in the system of FIG. 1, according to some embodiments;

FIG. 5 shows a listing of examples of extracted questions and corresponding cleaned (e.g., preprocessed) questions, according to some embodiments;

FIG. 6 shows an example categorization output from the accuracy threshold testing pipeline segment, according to some embodiments;

DETAILED DESCRIPTION

Figure 1:
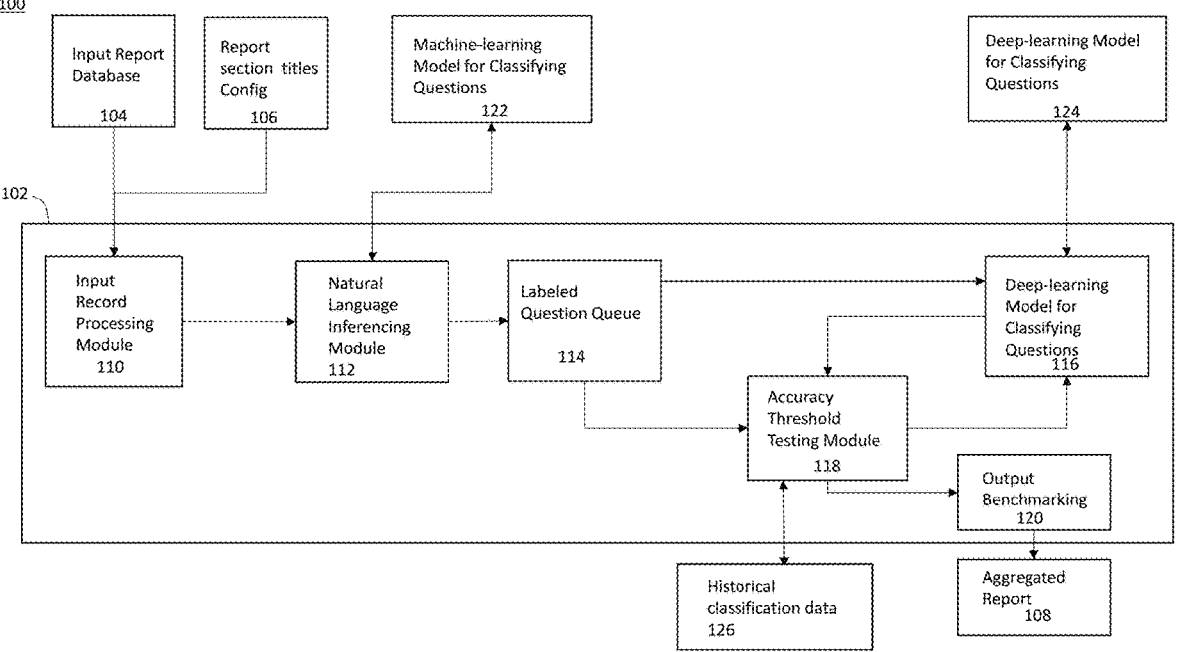
FIG. 1 shows the overall system architecture of an example system including a processing pipeline that includes a natural language inferencing pipeline segment that derives an intermediate classification of source data that is then fed into subsequent pipeline segments including a deep learning classification pipeline segment and an accuracy threshold testing pipeline segment before a final classification of the source data is made, according to some embodiments.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

A large number of reports, of varying types and sizes, are regularly generated by a large number of entities. The reports may be of any type such as, for example, evaluation reports, status reports, and other descriptive content regarding various types of entities, items or aspects. Trends such as the still accelerating trend to digitize as much content as possible, the improving performance and the reducing cost of interconnection networks and digital storage, etc. continue to grow the size and availability of data stores such as corpuses of reports and the like. The digitization of such reports offers many opportunities for useful analysis across the various entities that generate the reports.

But while a large subset of such reports from different entities and/or over different years can be directed to the same or similar aspects (e.g., board performance evaluation reports, employee performance evaluation reports, inventory evaluations, academic evaluations, etc.), the internal structure of such reports is often different from one report to another. For example, the division and/or naming of sections, questions posed within corresponding sections to elicit responses, etc. may often not be identical.

The differences in the internal structure of respective reports that are directed to the same or similar aspects, unless addressed effectively, can reduce the accuracy and efficiency of any analysis that can be performed based on aggregating the reports across large segments of entities and/or over time.

Example embodiments of this disclosure provide for improved (e.g., higher accuracy and time-efficient) aggregation of such report data. Example embodiments provide for effectively combining machine learning and deep learning to classify unlabeled source data to determine a reliable classification, or a labeling, of that source data. The classified or labeled source data can be used to generate reports that provide extensive insight into the aggregated source data. The systems and methods of example embodiments may be, in one example application, be used to regularly automatically process collections of reports from numerous entities where each report provides various performance metrics for a particular entity, to compare the various performance metrics from the numerous entities in a common framework even if the performance metrics are described differently among the numerous entities. The comparison in the common framework can be used generate dashboards or other user interface displays to illustrate the aggregated source data at varying levels of granularity.

Figure 2:
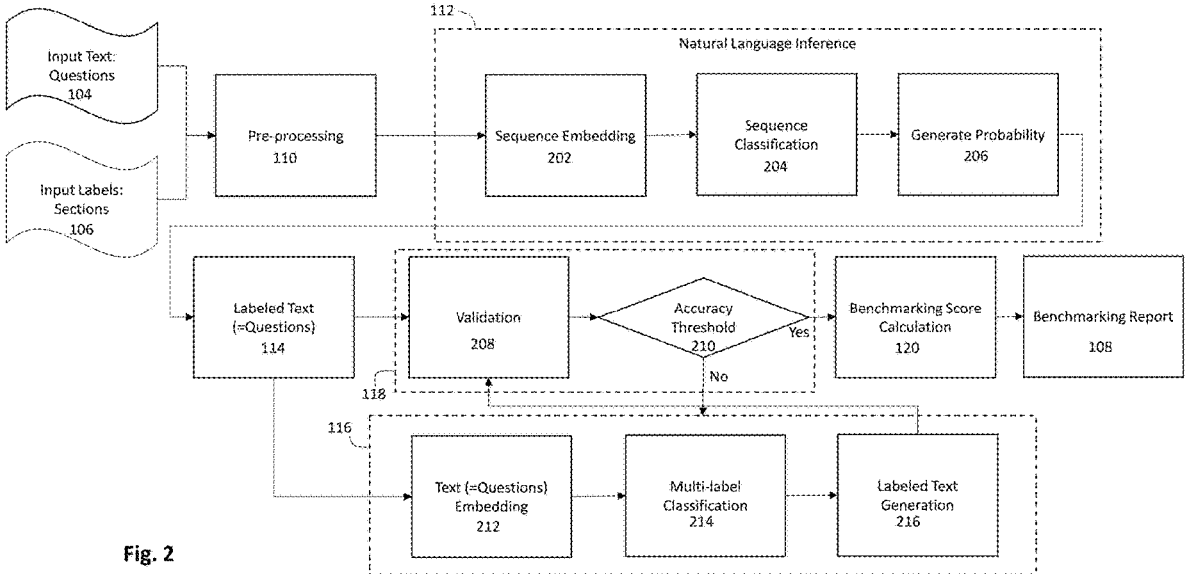
FIG. 2 shows the flow of data among the different processing pipeline segments, and the internal organization of some of the processing pipeline segments in the system of FIG. 1, according to some embodiments.
Figure 7:
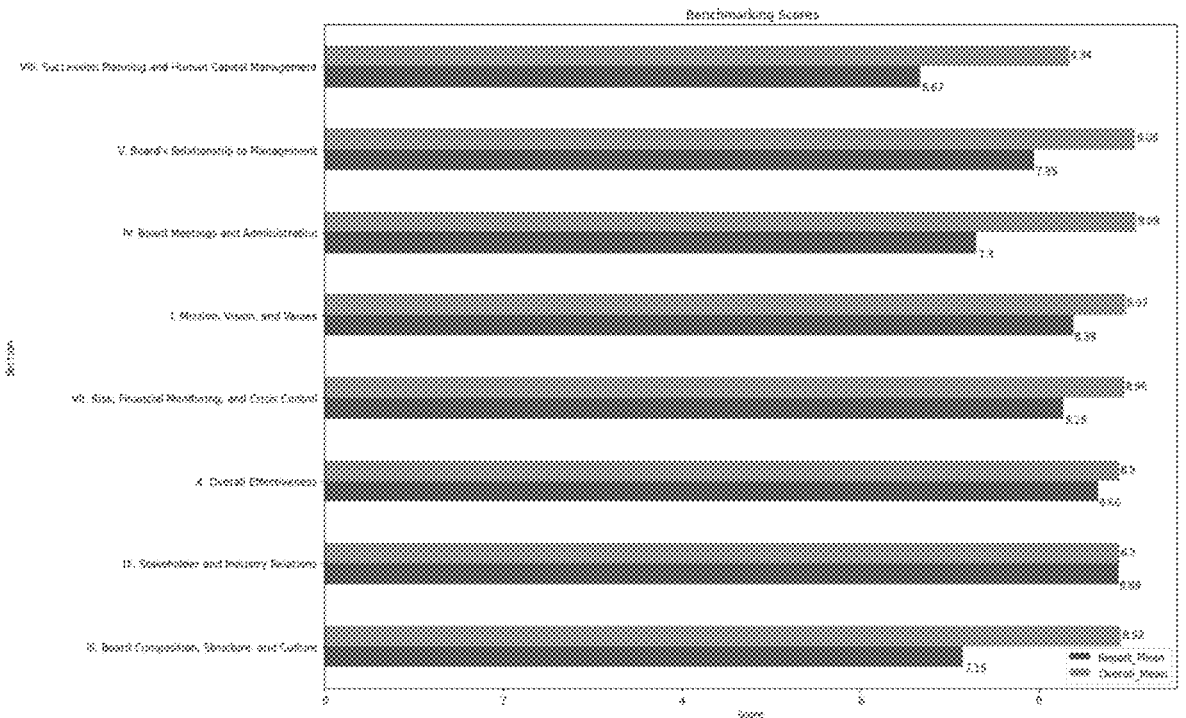
FIG. 7 shows an example dashboard for visualizing the categorized data, according to some embodiments.
Figure 8:
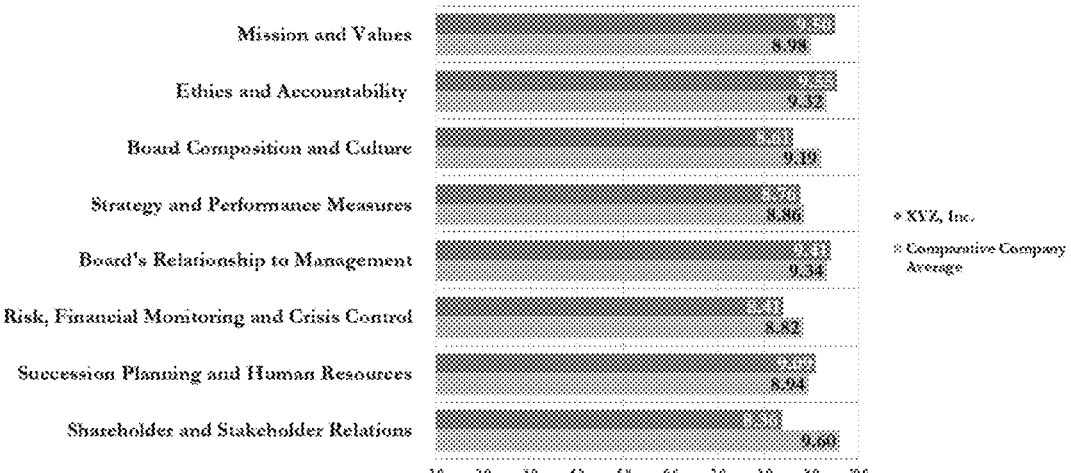
FIG. 8 shows another example dashboard for visualizing the categorized data, according to some embodiments.
Figure 9:
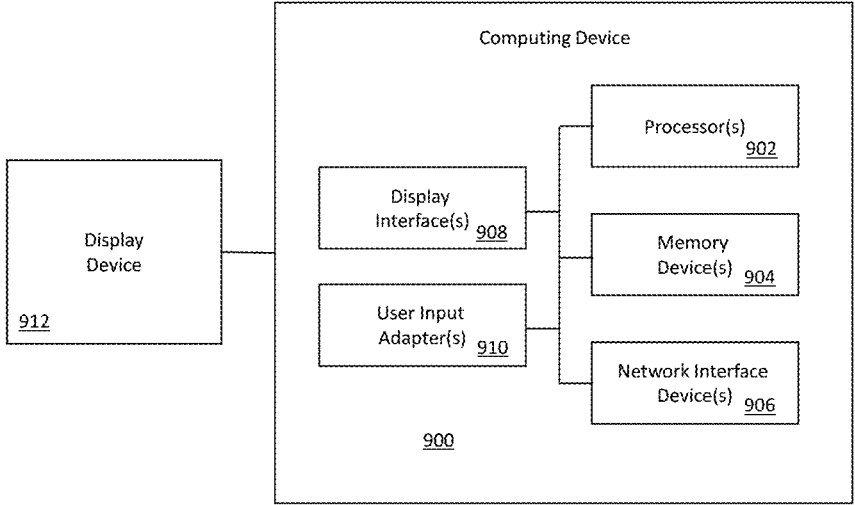
FIG. 9 shows an example computing device that may be used in some embodiments to implement features described herein.

FIG. 1 shows the overall architecture of an example system including the processing pipeline that takes as input a collection of source data and a list of predefined report sections. The processing pipeline includes a machine learning-based natural language inferencing pipeline segment that derives an intermediate classification of the source data that is then fed into subsequent pipeline segments including a deep learning classification pipeline segment and accuracy threshold testing pipeline segment before a final classification of the source data is made. FIG. 2 illustrates the flow of data among the different processing pipeline segments, and also the internal organization of some of the processing pipeline segments. FIG. 3 and FIG. 4 show examples of an input to the preprocessing pipeline segment, and an example output from the preprocessing pipeline segment. FIG. 5 shows a listing of examples of extracted questions and corresponding cleaned (e.g., preprocessed) questions. FIG. 6 is an example categorization output from the accuracy threshold testing pipeline segment, and FIGS. 7 and 8 show example dashboards for visualizing the categorized data. FIG. 9 shows an example computer system on which the system of FIG. 1 can be implemented.

As already noted, example embodiments of this disclosure relate to systems and techniques for generating reports of classified (grouped) source data for various reporting and/or display purposes. Processing pipelines combining machine learning (ML) inferencing and deep learning (DL) multi-label classification are employed in example embodiments. User interfaces are provided so that large collections of source data can be viewed and analyzed efficiently utilizing the output from the processing pipeline.

"Machine learning" and "deep learning", as the terms are used in this disclosure, refer to different artificial intelligence (AI) learning techniques. Machine learning (ML) is a subset of AI that enables systems to learn from input data, identify patterns and make decisions with minimal human intervention. A ML model learns from a training dataset to make predictions on a test dataset, which may comprise yet unseen data. Deep learning (DL) is a subset of ML that enables machines to learn by example. Deep learning algorithms enable systems to recognize intricate patterns in the data on their own by using multiple processing layers. In one embodiment, "deep learning" refers to a machine learning algorithms that use neural networks having a plurality of levels layers of nonlinear processing nodes for feature extraction and transformation. Each layer of the plurality of layers uses the output from the preceding layer as input. In general, the DL neural network's accuracy may increase with the number of layers, which is a measure of the depth of the neural network. In ML, data scientists typically prepare or design representations of input features and algorithms to optimize weights to make best performing models. In contrast, DL attempts to learn several layers of representations of increasing complexity. A DL architecture starts with deep belief networks and Markov Random Fields with multiple layers, and one or more types of multiple-layer neural networks. The DL architecture consists of an input layer that includes raw inputs, hidden layers that learn more abstract representations, and an output layer that may predict a supervised target. Machine learning is considered to require less processing power and is faster than deep learning. Deep learning, while generally requiring more processing power than machine learning, yields results that are generally more accurate than machine learning. In some embodiments, an accuracy thresholding test enables the system disclosed herein to selectively leverage the particular processing requirements and strengths of machine learning and deep learning to yield results that improve processor-efficiency and accuracy of the system.

In many places in this document, software (e.g., modules, software engines, processing instances, services, applications and the like) and actions (e.g., functionality) performed by software are described. This is done for ease of description; it should be understood that, whenever it is described in this document that software performs any action, the action is in actuality performed by underlying hardware elements (such as a processor and a memory device) according to the instructions that comprise the software. Such functionality may, in some embodiments, be provided in the form of firmware and/or hardware implementations. Further details regarding this are provided below in, among other places, the description of FIG. 9.

Description of FIG. 1

FIG. 1 shows the overall system architecture of an example system 100 that utilizes a processing pipeline 102 that includes a machine learning natural language inferencing pipeline segment followed by a deep learning classification pipeline segment to generate reports from input data collections, according to some embodiments. The pipeline is enabled to engage deep learning selectively based on accuracy threshold testing of intermediate results generated by the natural language inferencing. The example system 100 enables users to obtain a classification (grouping) of the source data contained in the data collection into a predefined set of subject matter categories.

The processing pipeline 102 takes as input at least one data collection (also referred to as input report database) 104 and a list of predefined categories (also referred to as list of predefined section titles) 106 and generates a classification of source data contained in the at least one data collection 104 into categories defined in the list of predefined categories 106. The one or more processors of the processing pipeline may be located on at least one computer server at a single geographic location or may be distributed on multiple computer servers that are located in several different geographic locations that are interconnected by one or more communication networks. In some embodiments, some of the processing pipeline segments may be implemented on different types of processors (e.g., CPU, GPU) in accordance with what type of processor is considered to be more efficient for the particular type of processing requirements of the respective pipeline stages. In some embodiments, one or more segments of the processing pipeline 102 may be implemented as a service in a cloud infrastructure. The input, such as, for example, the at least one data collection 104 may also be either centrally located in one geographic location or spread through several geographic locations. In some embodiments, the at least one data collection 104 is stored in a database local to at least one segment of the processing pipeline 102.

In some embodiments, the at least one data collection 104 comprises one or more reports with each report containing a plurality of sections. Each section includes one or more questions, to which responses may be provided. In one example embodiment, the reports are annual corporate board evaluation reports, where each report comprises a plurality of sections with each section comprising one or more questions for which respondents provide answers. Each section is assigned a section title. The respective reports are not required in example embodiments to confirm to a specific format, a specific set of sections, or a specific set of questions. Therefore, the section titles and the questions may be the same or different among the various reports or sections. In some embodiments, each section is titled with a section title that is in text form, and the one or more questions also in text form. Text may include any alphanumeric characters and punctuation. Each section title and question is made up of a respective text string, where each string includes one or more words. In some embodiments, a section title and/or question may comprise one or more sentences. In some embodiments, a section title and/or question may comprise a sentence fragment (i.e., a grammatically incomplete or incorrect sentence). Example embodiments do not limit the number of sections and/or the number of questions per section. Example embodiments do not limit the section titles and questions to particular formats.

In some embodiments, the list of predefined categories 106 specifies a plurality of section titles for an output report. In one embodiment, the list of predefined categories 106 specifies a predefined set of section titles for a corporate board evaluation report. The aggregated report 108 that is output from processing pipeline 102 comprises an aggregation of data in the data collection 104 into a plurality of predefined sections including one or more sections with section titles from the list of predefined categories 106. In one example embodiment, the aggregated report 108 is an aggregated corporate board evaluation report and comprises a plurality of sections each identified by a predefined section title as specified in the list of predefined categories 106. Each predefined section comprises a plurality of the questions of the respective reports from the data collection 104. The aggregated report 108, in example embodiments, may have sections corresponding to one or more of the section titles specified in the list of predefined categories 106.

In one example embodiment, the system 100 can be used in generating a peer benchmarking report based on surveys such as annual board evaluation surveys of a large number of corporations. Example peer benchmarking reports are shown in FIGS. 7 and 8. Example goals of such reports may include the capability to provide clients with a holistic snapshot of board engagement across a specific industry or market size; enabling clients to develop better board engagement practices by understanding their priorities against their peers; monitoring board performance year-over-year; encouraging discussions with corporate leadership about board engagement best practices and industry-specific leadership strategies; and finding trends in the benchmarked data allows identification of new topics in the board engagement space. It should be noted that, although embodiments in this disclosure are primarily described in relation to corporate board evaluation reports, embodiments are not limited thereto and can apply to many different types of reports or other outputs that contain categorized aggregated data.

Processing segments 110, 112, 114, 116, 118 and 120 of the processing pipeline 102 are engaged to process the source data from the at least one data collection 104 using a machine learning model 122 to derive an intermediate classification of the source data which may then be selectively input to a deep learning model 124 to determine a final classification of the data that is then included in the aggregated report 108.

The input record processing segment 110 is configured to take source data from the at least one data collection 104 as input and to transform and/or format that data to a form to be consumed by the natural language inferencing segment 112. The pre-processing performed by the segment 110 may include transforming and/or formatting the data so that one question is presented in each line of a formatted file, and any extraneous components such as section titles (e.g., section titles from the input reports) etc. are removed. Optionally punctuation etc. can be removed, added and/or rearranged so that only a portion that clearly (e.g., "clearly" as determined by the inferencing segment 112) represents a question remains on each line of the formatted file. In some embodiments, for a particular input section title and question combination, the corresponding question that is output may be different in form than the input question and may be in the form of a combination (e.g., concatenation) of the input section title and the input question.

The natural language inferencing segment 112 takes as input the questions as formatted by the input record processing segment 110 and the preconfigured section titles from the list of predefined section titles 106, and utilizes a machine learning model 122, to associate exactly one section title from the input preconfigured section titles with each question from the input questions. The natural language inferencing segment 112 determines, for each pair of input questions and predefined section titles, whether the given "hypothesis" (e.g., that the section title is associated with the question, or in other words, that the question is correctly categorized under the section title) logically follows from the "premise" (e.g., the section title and the question). According to an embodiment, segment 112 outputs a set of lines of text where each line of text comprises a section title from the input preconfigured section titles and a question from the input questions. In another embodiment, the section title and the corresponding question are arranged in respective adjacent lines and an empty line separates the respective section title and question pairs. Example embodiments may or may not associate a section title with each and every question in the input list of questions, and may exclude zero, one or more of the input questions from the set of section title associated questions. In some embodiments, one or more questions from the input question list may either be not included or may be included as being associated with a catch-all section (i.e., meaning otherwise "uncategorized" into any of the sections in the predefined section titles 106) in the set of section title associated questions.

The machine learning model 122 comprises the learned model information that is used by the pipeline segment 114. In some embodiments, the machine learning model 122 is updated dynamically during processing. During a modeling stage, the relative semantic embeddings are generated, and nearest neighbor search is conducted in the semantic attribute space to find the best similar result to the output of the network for classification. Then the category corresponding to the nearest semantic embedding may be predicted as the final category of the input feature. In other words, the classification process uses semantic embeddings for classification.

The set of section title associated questions from the natural language inferencing segment 112 is received by a labeled question queue segment 114. The set of section title associated questions may be referred to as "set of intermediate results," "intermediate set of results," or "intermediate labeled questions".

The section title associated questions may then be selectively processed through the deep learning segment 116 and relabeled if appropriate before being processed through the accuracy threshold testing segment 118.

In one embodiment, for example, a processing step in segment 114 may analyze the current set of section title associated questions to recognize certain predetermined patterns (e.g., same question portion in respective questions being associated with different section titles, identical (or substantially similar) section title associated questions in the set) and accordingly determine what the next processing step would be for each section title associated question. Such predetermined patterns can be recognized using historical data 126. The historical data 126 can be updated during the operation of system 100 to keep track of the classifications output by the system 100 (or only the classifications that are above a certain predetermined level of confidence) so that the accuracy threshold testing 118 can dynamically adapt its threshold testing criteria over time as the system 100 is being used. Some of the section title associated questions are input directly to the accuracy threshold testing segment 118 and others of the section title associated questions are input to the deep learning segment 116.

In some embodiments, segment 114 may implement techniques to determine (e.g., select) which of the section title associated questions are eligible to be directly input to the accuracy threshold testing pipeline segment 118 and which are first input to the deep learning module 116. The selection may be based on the processing capacity (e.g., processor capacity availability and/or memory availability) available for the deep learning module 116, the number of input questions from the data collection 104, time available for obtaining a final result ("final set of results") etc. For example, as described further below, the deep learning segment 116 generally requires substantial processing capacity and processing time (in a manner dependent on the manner of processing in each layer of the neural network, the size of the respective layers, and the number of layers) to output results. In some embodiments, the segment 114 may dynamically reconfigure the criteria that determines which of the intermediate results to be sent directly to the accuracy threshold testing segment 118 and those to be sent to the deep learning segment 116. For example, while processing a large set of input questions 104, the system 100 may dynamically determine, based on real-time monitoring of the processing environment (e.g., processor, memory and/or network workloads), availability and/or consumed time, that the number of intermediate results to be sent to the deep learning segment 116 should be reduced (e.g., or throttled) so that certain predetermined processing resource thresholds and/or total consumed time thresholds can be satisfied to improve the system's operational reliability (e.g., prevent or reduce system crashes) and/or practicality (e.g., capability to provide final results in a time-efficient manner). Persons of skill in the art will appreciate that, since the deep learning segment 116 is considered to improve the accuracy of the final categorization of the input questions, reducing the portion of the questions of the total number of input questions that is submitted to processing by the deep learning segment 116 may involve a tradeoff in the level of accuracy of the final categorization.

The deep learning segment 116 takes section title associated questions of the intermediate results (e.g., a selected subset thereof) and utilizes a deep learning model 124 to reclassify the input questions and, if determined to be appropriate, to relabel the respective input questions. A relabeled question, in some instances, may associate one of the predefined section titles that is different from the predefined section title that was associated with that question. In some other instances, the relabeled question may associate one of the predefined section titles that is the same as the predefined section title that was associated with that question. The relabeled question is then provided as input to the accuracy threshold testing segment 118.

The deep learning model 122 comprises the learned model information that is used by the pipeline segment 116, such as, for example, the layer configuration and the weight configuration of the neural network used in pipeline segment 116. In some embodiments, the deep learning model 124 is updated dynamically during processing. In one example implementation, the model is loaded from "BertForSequenceClassification" package in the "Transformers" package by GOOGLE. By using the package, loading of the pretrained models named "bert-base-uncased" and set up the number of classification label are performed. After tokenizing the data and putting the data into the "torch dataset" format, the "Trainer" package in the transformers package and the training data may be used to fine tune the parameters in the pretrained model by setting the training arguments such as, for example, batch size, learning rate, and number of epochs. Additionally, an accuracy metric can be calculated for each epoch for the validation dataset to track if the metric reaches the ideal threshold.

The accuracy threshold testing segment 118, in some embodiments, provides for an operator to determine whether each labeled question received directly from the segment 114 and each relabeled question received from the deep learning segment 116, whether the labeled or relabeled question satisfy a level of accuracy. That is, in an embodiment, the operator may view each labeled or relabeled question on a display screen and may select either to indicate that the labeled or relabeled question is ready to be added to the set of output questions, or to indicate that the labeled or relabeled question is not sufficiently accurate. When the operator indicates that the labeled or relabeled question is sufficiently accurate, it is added to the set of output questions and provided as input to the output benchmarking segment 120. When the operator indicates that the labeled or relabeled question is not sufficiently accurate, it is input to the deep learning segment 116 that then reprocesses the labeled or relabeled question before providing the processed labeled or relabeled question to the accuracy threshold testing segment 118.

In some embodiments, the accuracy threshold testing is performed entirely automatically without manual intervention. In one embodiment, the accuracy of a particular association between a section title and a question can be evaluated based on historical data. The historical data may include a database that represents each predefined section title and one or more example questions that can be associated with each section title. Each of the one or more example questions may be associated with a similarity score. The similarity score threshold associated with a particular question associated a particular section title may represent that in the historical data each question that was associated with a section corresponding to the particular section title had a similarity score within the threshold similarity score associated with that question. The similarity score may be determined using any known technique such as Euclidean distance, Manhatten distance, cosine similarity, Jaccard distance, etc., or a combination thereof. The accuracy test for the particular association from the intermediate results may comprise of matching the section title of the particular association to a section title in the historical data and measuring a similarity distance to one or more of the questions that the historical data associates with the section title. If the particular association from the intermediate results exceeds, as determined by the automated mechanism in the accuracy threshold testing segment 118, the accuracy threshold, that is, the similarity score thresholds associated with each of the sample questions associated with the corresponding one or more headers in the historical data, then the particular association is directed to the output benchmarking segment 120. When the particular association fails the accuracy threshold test, then the particular association is submitted or resubmitted to the deep learning segment 116. The repeated processing of particular questions by the deep learning segment 116 until determined to satisfy certain criteria in the accuracy threshold testing segment 118 gradually improves the accuracy of the deep learning segment 116 over time.

The output benchmarking segment 120 is configured to aggregate and benchmark the labeled questions received from the accuracy threshold testing segment 118. The benchmarking, for each section-question association received from the accuracy threshold testing segment 118, may include calculating and optionally updating one or more metrics associated with questions identified for one or more particular categories. The output benchmarking segment 120 may generate an aggregated data report 108.

Example aggregated data reports 108 are shown in FIGS. 7 and 8. An aggregated data report 108 can be generated to show one or more aspects of the data in the input report database 104. For example, in one embodiment, report 108 can be generated to show, for each section corresponding to the list of predefined section titles 106, a score for each of one or more questions for a particular corporation in comparison to an average, mean and/or max score of other corporations in a particular category. The aggregated report can be displayed on a user interface on a client device, saved to a digital storage for subsequent viewing, transmitted to another computing process or device for further processing, or directed to a printer.

It should be understood that the software segments shown in FIG. 1 and other figures are stored in and executed by hardware components (such as processors and memories), and it should be further understood that, whenever it is described in this document that a software segment performs any action, that is done solely for ease of description, and the action is in actuality performed by the underlying hardware elements (such as a processor and a memory device) according to the instructions and data that comprise the software segment. Further details regarding example hardware components that may be used to implement the features described herein are provided below with reference to FIG. 9, as well as elsewhere in this document.

The data (e.g., text of reports containing section titles and questions, lists of predefined section titles per type of report) described throughout the disclosure can include data that is stored on a database stored or hosted on a standalone server, local area network, or a cloud computing platform. In some embodiments, for example, the data may be hosted on any of a private cloud, community cloud, public cloud or hybrid cloud, and the software associated with the system 100 can be provided in accordance with a software-as-a-service model for end users to select one or more particular reports for analyzing, configure an aggregate report content and format, configure other parameters (e.g., accuracy thresholds, time, etc.). It is to be understood that although this disclosure includes descriptions of particular computing environments, implementation of the teachings recited herein are not limited to those particular computing environments. Rather, embodiments of the present invention are capable of being implemented in conjunction with any type of computing environment now known or later developed. Description of FIG. 2

FIG. 2 illustrates the configuration of the natural language inference processing pipeline segment 112, the accuracy threshold testing processing pipeline segment 118 and the deep learning processing pipeline segment 116 of system 100 shown in FIG. 1, according to some example embodiments.

The input report database 104 provides input text, which comprises a plurality of questions, and the predefined list of section titles 106 provides input labels, which comprises a plurality of predetermined section titles, as input to the input record processing segment 110 for preprocessing. Preprocessing was described above in relation to FIG. 1. The preprocessed input text and the input labels are received as input in the natural language inference processing pipeline segment 112. The natural language inference processing pipeline segment 112 comprises a sequence embedding sub-segment 202, a sequence classification sub-segment 204, and a probability generation sub-segment 206.

Sequence embedding in sub-segment 202 provides an embedding function that transforms each sequence (e.g., each input question or each predefined section title) into at least one vector. In some embodiments, the vector may encode the position of particular words in a sentence and may also encode the co-occurrence of word pairs or groups of words. Word embedding provides a representation of words for text analysis, in some embodiments in the form of a real-valued vector, that encodes the meaning of the word such that words that are closer in vector space are expected to be similar in meaning. The word embeddings generated from a larger corpus of words may generally represent semantic and syntactic associations among words more accurately than those obtained based on a smaller corpus. TF-IDF is an example word embedding technique that can be employed in example embodiments. The sequence embeddings generated by the sequence embedding sub-segment 202 are provided as input to the sequence classification sub-segment 204.

The sequence classification sub-segment 204 performs a classification of the input questions to respective ones the plurality of predefined section headers. In some embodiments, Zero-shot learning (ZSL) is used for classification in the sequence classification sub-segment 204. ZSL provides for learning how to recognize new concepts by having only a description of them. ZSL consists in recognizing new categories of instances without training examples, by providing a high level description of the new categories that relate them to categories previously learned by the machine. This is done by means of leveraging an intermediate level: attributes that provide semantic information about the categories to classify. ZSL approaches are designed to learn this intermediate semantic layer, the attributes, and apply them at inference time to predict new classes, provided with their description in terms of these attributes. ZSL methods generally work by associating observed and non-observed classes through some form of auxiliary information, which encodes detectable distinguishing properties of items. Unlike standard generalization in machine learning, where classifiers are expected to correctly classify new samples to classes they have already observed during training, in ZSL, no samples from the classes may have been provided during training the classifier. The technique requires auxiliary information about these zero-shot classes to be provided, and this type of information can be of several types.

Some embodiments can be considered to perform "multiclass text classification". In classification problems, as the number of classes increases, correctly classifying a new instance into one of them is assumed to be more challenging than making the same decision in the presence of fewer classes. The essence of the problem is that using the learning algorithm on each decision boundary individually is better than using the same learning algorithm on several of them simultaneously.

In order to understand this phenomenon, the concept of heterogeneity of decision boundaries may be helpful. The concept of heterogeneity in decision boundaries relates to the relationship of these decision boundaries through the lens of a learning algorithm. Two decision boundaries can be heterogeneous under one learning algorithm and homogeneous under another.

The heterogeneity of decision boundaries is not a direct result of the geometrical properties of the decision boundaries, but rather of how those properties relate to each other through the learning algorithm. If two decision boundaries are heterogeneous, a learning algorithm will solve them better individually than simultaneously. One part of the classification problem can negatively affect another part of the problem in terms of classification performance. Some decision boundaries are incorrectly estimated by the presence of other decision boundaries; this is especially true when the same learning algorithms acting individually on the same decision boundaries are compared. In other words, whenever a learning algorithm has to solve two or more heterogeneous decision boundaries, the classification performance decreases.

Therefore, the information about the heterogeneity of decision boundaries can be used to devise approaches that obtain better classification performances. The information about the heterogeneity of decision boundaries can also be used to devise approaches that allow us to get similar classification performance at a lower computational cost as compared to approaches that do not use information about heterogeneity.

In other words, the context of some example embodiments is a multiple classification problem that uses a high number of features/classifiers. The class of problem is typically called multivariate, high dimensional or multivariable classification. Most conventional classification methodologies are not fitted to deal with a high number of parameters whose class separation capabilities are low (also known as weak features). For example, Artificial Neural Networks (ANN) are not usually a viable solution for problems with a high number of weak features due to instability. Conventional neural network training usually produces considerably different models if the training data is slightly different. When the number of features is high, this issue is exacerbated, so it is difficult to achieve proper convergence in the training stage.

One useful technique to deal with multivariate problems is by treating each feature as a single metaclassifier and then combining the individual outputs, for example using a winner takes all scheme. This is considered reasonable because of several reasons; first, instability problems are avoided, second, it is easier to train one classifier per feature than a complex classifier with multiple inputs (one per feature) and third, high dimensionality issues are prevented.

Therefore, ZSL may be a good option for multiclass classification. ZSL is a variant of multi-class classification problem where no training data is available for some of the classes. Most ZSL algorithms use some connection between the available information and the unseen classes. In practice, ZSL-based models sometimes result in a higher accuracy than supervised models that have been trained on hundreds of labeled training items, and because the ZSL mechanism provides the information about the heterogeneity of decision boundaries for multiclass classification problem.

In one embodiment, each of the predefined section titles is accompanied with a text description of the semantics of that section title. The text description may include a definition of the section title, and/or can be provided in free form description of the title. The pipeline sub-segments 202 and/or 204 generates a signature associated with each of the predefined section titles, where the signature comprises a plurality of attributes generated based on the text description of the respective section titles. The sub-segment 204 may then perform the classification based on various measures of proximity of the questions to the definition and/or free form descriptions associated with each of the predefined section titles. The signatures etc. can be stored in the machine learning model 122 to be utilized by the pipeline segment 112.

Yin et al., "Benchmarking Zero-shot Text Classification: Datasets, Evaluation and Entailment Approach", arXiv (2019), incorporated herein in its entirety, provides a description of zero-shot learning. One example approach that may be used in example embodiments uses a pre-trained sequence-pair classifier as an out-of-the-box zero-shot text classifier. An example implementation takes the sequence of input questions as the "premise" and each candidate label (each of the predefined section titles) into a "hypothesis." If the inferencing model predicts for a particular premise-hypothesis combination that the premise "entails" the hypothesis, the label may be taken to be true.

The probability generation sub-segment 206 in cooperation with sub-segment 204 assigns a probability to each of the pairings of an input question to a section title from the predefined section titles 106 based on the classification. For example, the hypothesis may be "the board effectively manages conflict" (input question) is related to "Mission and Values" (predefined section title) label. The model generates probabilities for the hypothesis. In some embodiments, every combination of predefined section title-question is assigned a probability. A classifier may map an input attribute vector corresponding to an input question to a confidence that the input question belongs to a class represented by one of the predefined section titles. Such classification may employ a probabilistic and/or statistical-based analysis.

ZSL is trained on one set of labels and evaluated on a different set of labels that the ZSL model has not seen (e.g., processed) before. The ZSL model is given the questions and all the available labels, and then ZSL can make its own prediction. In contrast, the correct labels are given to each question before using BERT.

During the modeling stage, ZSL generates the relative semantic embedding and conducts nearest neighbor search in the semantic attribute space to find the best similar result to the output of the network for classification. And then the category corresponding to the nearest semantic embedding is predicted as the final category of the input feature. In other words, the classification part uses the semantic embeddings for classification, which makes it possible for ZSL to perform classification tasks.

There are many different forms of ZSL architectures, and all the architectures attempt to learn the relation between sentence and label embeddings. To make a trained model that can compute relatedness score of sentences with labels, embeddings must be generated from the texts by using a pretrained language model (e.g., BERT), for example.

Initially, the zero-shot setting for text classification was explored by the dataless classification framework. The document as well as the classes presentations use Explicit Semantic Analysis (ESA) as a latent representation. The semantics of a class is based on the class name as external knowledge resource. This classifier performs strict ZSL, which refers to not using any task specific training data. It is achieved by comparing classes and documents in the same latent space by the L2 norm, making alignment unnecessary. This work got extended using cosine similarity and several neural network based word embeddings, like, for example, "Word2Vec". Recently, more contextualized information is utilized to improve ZSL. One approach reformulates text classification as a textual entailment problem by generating a hypothesis for each class, like "This text is about sports".

Natural language inference (NLI) considers two sentences: a "premise" and a "hypothesis". The task is to determine whether the hypothesis is true (entailment) or false (contradiction) given the premise. When using transformer architectures like BERT, NLI datasets are typically modeled via sequence-pair classification. That is, both the premise and the hypothesis can be fed through the model together as distinct segments and a classification head predicting one of [contradiction, neutral, entailment] can be learned.

It is notable that the additional textual context may not add background knowledge, but usually supports the alignment between document and class representations. Additionally, a binarization approach generalizes even to a heterogeneous set of text classification tasks, e.g., topic detection, sentiment analysis. A similar approach interprets classification as a "cloze" task using a masked pattern, like "[Category:]". Based on this, a language model can predict the class based on most-likely class names. The zero-shot model that uses pretrained language models (e.g., BERT, GPT-3) may show a substantially improved performance on several NLP tasks by only providing a brief task description.

Some embodiments may, as an alternative to using ZSL in the natural language inferencing pipeline segment 112, utilize other machine learning algorithms, including but not limited to, nearest neighbor, decision trees, support vector machines (SVM), Bayesian networks, evolutionary algorithms, and the like. For example, another classifier that can be employed in some embodiments is a support vector machine (SVM). The SVM operates by finding a hypersurface in the space of possible inputs, where the hypersurface attempts to split the triggering criteria from the non-triggering events. Intuitively, this makes the classification correct for testing data that is near, but not identical to training data.

For each question an associated section title is determined based on the probabilities. In one embodiment, for a particular question, the section title which has the highest probability as determined by the probability generation sub-segment 206 is selected as the associated section title. These associations of a section title and a question form the set of intermediate results that is output from the natural language inferencing pipeline segment 112. The set of intermediate results output from segment 112 is input to the labeled question queue 114. In the set of intermediate results, whereas each question is associated with only one section title, each section title may be associated with any number of questions. In an example implementation, the "pipeline" package from the Transformers package can be used, and the "zero-shot-classification" pipeline may be used with a pretrained model such as, for example, "facebook/bart-large-mnli".

The labeled question queue 114 may be a file or a buffer (e.g., a queue or other data structure) that may be configured to either actively push labeled questions to the next processing element and/or to wait for the next processing elements to pull respective labeled questions from it.

The next processing element to obtain inputs from the labelled question queue 114 may be the accuracy threshold testing pipeline segment 118 or the deep learning classification pipeline segment 116. The labeled question queue 114 may, in some embodiments, send section title-question associations that have a confidence level assigned by the segment 112 that is below a predefined threshold to the deep learning classification segment 116 while those having a confidence level that is higher than the predefined threshold may be sent directly to the accuracy threshold testing segment 118.

In some embodiments, in the accuracy threshold testing segment 118, the labeled questions are validated by a subject matter expert (SME) for an accuracy threshold in a human-in-the-loop manner. If they are sufficiently accurate, they are provided to the benchmarking segment. If not sufficiently accurate, then they are provided to the multi-label classification model which provides a repetitive procedure by generating labeled text again. Classification includes a calibration. The accuracy threshold can be determined using the calibration information using tree search/Bayesian search part. That is, in some implementations, based on the SME feedback on the labels produced by ZSL, the BERT pretrained model can be tuned using the labels provided by SME, to deliver new sets of labeling results until both model's validation accuracy and SME's evaluation accuracy reach above the threshold.

The deep learning processing pipeline segment 116 comprises a text embedding sub-segment 212, a classification model sub-segment 214, and a labeled text sub-segment 216. At least some of the labeled questions from the labeled question queue 114 are received as input into segment 116.

According to some embodiments, the text embedding sub-segment uses a model such as, for example, the BERT (Bidirectional Encoder Representations from Transformers) model to convert each question to a numerical vector. The numerical vector encodes syntactic and also semantic/contextual aspects of the question. BERT is a known model to convert text information to numeric vectors in a manner that encodes the text information in context. Word2Vec or other tools that generate word embedding without contextual information and are not suitable for use in example embodiments for use in the deep learning classification processing pipeline segment 116. In some embodiments, BERT may generate a plurality of numeric vectors for each question or predefined section title. Devlin et al., Google AI Language, "BERT: Pre-training of Deep Bidirectional Transformers for Language Understanding," arXiv (May 2019), describes an example implementation of BERT. In an example implementation, "BertTokenizer" and "BertForSequenceClassification" packages from the Transformers package were used.

In some embodiments, the sentence-BERT (SBERT) technique is used. In SBERT, each sentence is mapped to a fixed-size vector in a vector space where similar sentences are proximate to each other. SBERT is a modification of the pre-trained BERT technique that operates similarly to BERT. The number of forward-passes needed grows linearly, making large scale similarity search practical. SBERT embeds sequences and labels into the same latent space where their distance can be measured, but that can provide information about the compatibility of two distinct sequences. SBERT adds an average pooling layer on top of the final layer of BERT to create sentence embeddings and uses the embeddings as input to sub-network targeted at the fine-tuning task. In SBERT, a unique vector representation of a sentence is encoded based on its semantic signature. The representation is built during contrastive training by adapting a transformer model in, for example, a "Siamese" architecture, aiming to minimize the distance between semantically similar sentences, and to maximize the distance between sentences that are semantically distant.

The questions and the labels are already in preprocessed uniform form, and therefore, can be subjected to text embedding. In some embodiments, at the time of testing questions, the deep learning model already includes knowledge of the predefined section titles. For example, in some embodiments, a single bit vector may be used to represent all of the candidate labels (predefined section titles) by having a respective one of the candidate labels being represented by each bit position. For any question in the set of intermediate results that is selected for being input to the deep learning classification processing pipeline segment 116, that question may be tested in the classification model against each of the predefined section titles.

The classification model sub-segment 214 processes the generated vectors to perform multi-label classification. The classification model may comprise a deep neural network, in some embodiments, a deep convolution neural network (CNN) that takes as input the one or more vectors representing each of the input questions, and having processed the input through multiple layers of the neural network, generates one or more predefined section titles that are most suitably associated with the input question. In some embodiments, the multi-label classification is performed using a BERT-based classification model. BERT is a framework provided by Google, and may be described as an encoder stack of transformer architecture. A transformer architecture is an encoder-decoder network that uses self-attention on the encoder side and attention on the decoder side. In some implementations, BERT has 12 layers in the encoder stack while other BERT implementations have 24 layers in the encoder stack. The BERT neural network configuration, such as the number of layers, number of nodes per layer, weight configuration, etc. may be stored, used and updated dynamically in the deep learning model 124 during processing in the pipeline segments 116 and 118.

In some embodiments, a single section title may be output, and in other embodiments more than one section title may be output each with an associated probability or another indication of a level of suitability/match. In some embodiments, the output may be a bit vector that encodes the selected one or more predefined section titles. In some embodiments, another multi-label classification model may be used. In some successive embodiments, any suitable deep learning architecture may be used, such as deep neural networks, deep belief networks, and/or recurrent neural networks. In another embodiment, the deep learning algorithms may learn in supervised and/or unsupervised manners.

The labelling sub-segment 216 associates one of the predefined section titles with a question in accordance with the output of the classification sub-segment 214 to generate a labeled question that can be provided to the accuracy threshold testing segment 118.

The labeled questions being output from the deep learning classification pipeline segment 116 are input to the accuracy threshold testing pipeline. Note that, as described above, the accuracy threshold testing segment 118 also receives labeled questions (i.e. labeled by the natural language inferencing sub-segment 112) from the labelled questions queue 114.

The accuracy threshold testing processing segment 118 comprises a validation sub-segment 208 and the accuracy threshold testing sub-segment 210. As noted above, input to segment 118 can be received from the labeled question queue 114 and/or deep learning processing pipeline segment 116.

In one embodiment, the validation sub-segment 208 is performed by a human subject matter operator. This configuration was observed to gradually increase the accuracy of the classification. In another embodiment, the validation in sub-segment 208 is performed by a computer in accordance with one or more of the techniques described above in relation the accuracy threshold testing segment 118 shown in FIG. 1.

The output from the accuracy threshold testing processing pipeline segment 118 is sent to the benchmarking score calculation segment 120. The benchmarking score calculation segment 120 generates the benchmarking report 108 as described for example in relation to FIG. 1.

Description of FIG. 3

FIG. 3 shows an example input text that may be provided as input to the system 100 from the input report database 104.

The input text includes questions, and optionally additional text such as, for example, section headers associated with the questions. In the example of FIG. 3, the input may be a file in which each line of text comprises a section title and a question. For example, the top line of text in the file shown in FIG. 3 contains "1. Ethics and Accountability", which is a header of a section from the relevant report, and "1. The Board takes affirmative steps to promote an atmosphere of ethical behavior, accountability, and risk awareness", which is a question from the section, concatenated into a single string.

However, the titles for corresponding sections may be different among different report generators (i.e., corporations to who the report pertains), different report types, and/or the same report (i.e., same report title from the same corporation) in different years. Similarly, the corresponding questions also may not be identical. Having unidentical section titles and/or questions referring to the same corresponding subject matter makes labeling the questions consistently and accurately a difficult task.

An example of unidentical questions and sections across companies and report type may be as follows: "VIII. Succession Planning and Human Resources 4. The Board actively reviews human resources issues as a Board agenda item (ABC Board Report, 2019)" and "IV. Succession Planning and Human Capital Management 1. The Board has in place a formal and comprehensive board succession plan. (ABD Board Report, 2021)" may represent corresponding subject matter in two reports. Both these concatenated section title and question examples refer to the same concept, but as can be seen, but they are different from each other.

Another aspect of the input text that makes labeling difficult is the unclear or ambiguous boundaries between section titles and questions. For example each of the following lines of text may be difficult to be separated or identified as a section title and a question: "II. Board Composition and Culture 1. The Board effectively manages conflict", "III. Board Composition, Structure, and Culture?", "X. Overall Effectiveness?", "II. Board Efficiency and Effectiveness 10. The Board is well informed about the Company's:_a. Strategic plan and operational goals_", "VI. Strategy and Performance Measures", and "X. Overall Effectiveness?".

Description of FIG. 4

FIG. 4 shows an example list of questions that can be provided as input to the natural language inference processing pipeline segment 112. The example list 400 of questions does not include any section titles and includes only questions. For example, the preprocessing segment 110 may process the input text such as input text 300 to, among other things, identify and remove the section title portion (if any) in each line, thereby leaving only the question in each line of text. It is this processed input file that has only a question on each line that is input to the natural language inferencing processing pipeline segment 112.

Note that the input file 400 may include duplicates (e.g., identical questions). For example, when two different reports (e.g., different report entities, and/pr same type of report in different years) have the identical question, they both should be included as separate question in order to keep accurate account of the sections and/or questions. That is, if duplicate questions are eliminated, then keeping track of the content of each report and/or section of the report accurately on a per report generating entity and/or per time-period would be made difficult or impractical.

Description of FIG. 5

FIG. 5 shows an example table that can be maintained internally to the system during the processing an input 300 through the system 100.

Each line of file 500 comprises a year of the report, and min, max and mean of the scores applicable to the question. The file may also store, for each question, the sentences (report's questions) extracted from a report (column marked "sents") as presented as input to system 100, the extracted section title ("section") represents a subset can be extracted from the sents column to indicate the section of the question if there's one, extracted question ("question") the subset extracted from sents column that indicate the question, and the labeled questions as output by the segment 112 and/or segment 116. For example, "full_question" and "question-cleaned" columns show a labeled question and a labeled question after being processed, respectively. The "full_question" is the combination of the section and question. This is used to ensure that both information are incorporate in the model. Each line may also include a report name and a report generation entity. The report_min, report_max, report_mean represent statistics provided by the report/survey participant. Such statistics can be used to generate the final report. The "question_cleaned" is obtained by preprocessing the "full question" column by replacing the abnormal (e.g., predetermined) characters and consolidating the text into lower case. This provides for the repreparation for the model to be run. Report 500 can be used for verifying the performance of the system 100.

Description of FIG. 6

FIG. 6 illustrates a set of labeled questions 600 that is output from the accuracy threshold testing segment 118. Each question in the set of labeled questions 600 is classified by the deep learning classification segment 116 or the validity evaluation sub-segment 208 to belong to a particular one of the predetermined input section headers. In the example of FIG. 6, each question is shown with its associated classification listed in the row immediately below the question. It will be understood that the representation of labeled questions is not limited to that shown in FIG. 6.

Description of FIG. 7 and FIG. 8

FIG. 7 shows a report 700 that may be produced based on the output from system 100.

The report 700 illustrates how a company AES is scored in each of the predetermined sections when compared to other companies being considered. In the example, example predetermined section titles are listed on the y-axis, and the x-axis illustrates the score associated with the aggregation, for each company, of all the questions in each report section. For each report section, the upper level bar indicates the mean value for the particular company, and the lower level bar indicates the mean value for the section among all companies.

FIG. 8 illustrates another report 800 that is similar to report 700. As can be seen, report 800 and report 700.

Description of FIG. 9

FIG. 9 is a block diagram of an example computing device 900 (which may also be referred to, for example, as a "computing device," "computer system," or "computing system") according to some embodiments. In some embodiments, the computing device 900 includes one or more of the following: one or more processors 902 (which may be referred to as "hardware processors" or individually as a "hardware processor"); one or more memory devices 904; one or more network interface devices 906; one or more display interfaces 908; and one or more user input adapters 910. Additionally, in some embodiments, the computing device 900 is connected to or includes a display device 912. As will explained below, these elements (e.g., the processors 902, memory devices 904, network interface devices 906, display interfaces 908, user input adapters 910, display device 912) are hardware devices (for example, electronic circuits or combinations of circuits) that are configured to perform various different functions for the computing device 900. In some embodiments, these components of the computing device 900 may be collectively referred to as computing resources (e.g., resources that are used to carry out execution of instructions and include the processors (one or more processors 902), storage (one or more memory devices 904), and I/O (network interface devices 906, one or more display interfaces 908, and one or more user input adapters 910). In some instances, the term processing resources may be used interchangeably with the term computing resources. In some embodiments, multiple instances of computing device 900 may arranged into a distributed computing system.

In some embodiments, each or any of the processors 902 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 902 uses an instruction set architecture such as x86 or Advanced RISC Machine (ARM).

In some embodiments, each or any of the memory devices 904 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 902). Memory devices 904 are examples of non-transitory computer-readable storage media.

In some embodiments, each or any of the network interface devices 906 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), LTE Pro, Fifth Generation New Radio (5G NR) and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, data is communicated over an electronic data network. An electronic data network includes implementations where data is communicated from one computer process space to computer process space and thus may include, for example, inter-process communication, pipes, sockets, and communication that occurs via direct cable, cross-connect cables, fiber channel, wired and wireless networks, and the like. In certain examples, network interface devices 906 may include ports or other connections that enable such connections to be made and communicate data electronically among the various components of a distributed computing system.

In some embodiments, each or any of the display interfaces 908 is or includes one or more circuits that receive data from the processors 902, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 912, which displays the image data. Alternatively or additionally, in some embodiments, each or any of the display interfaces 908 is or includes, for example, a video card, video adapter, or graphics processing unit (GPU).

In some embodiments, each or any of the user input adapters 910 is or includes one or more circuits that receive and process user input data from one or more user input devices (not shown in FIG. 9) that are included in, attached to, or otherwise in communication with the computing device 900, and that output data based on the received input data to the processors 902. Alternatively or additionally, in some embodiments each or any of the user input adapters 910 is or includes, for example, a PS/2 interface, a USB interface, a touchscreen controller, or the like; and/or the user input adapters 910 facilitates input from user input devices (not shown in FIG. 9) such as, for example, a keyboard, mouse, trackpad, touchscreen, etc.

In some embodiments, the display device 912 may be a Liquid Crystal Display (LCD) display, Light Emitting Diode (LED) display, or other type of display device. In embodiments where the display device 912 is a component of the computing device 900 (e.g., the computing device and the display device are included in a unified housing), the display device 912 may be a touchscreen display or non-touchscreen display. In embodiments where the display device 912 is connected to the computing device 900 (e.g., is external to the computing device 900 and communicates with the computing device 900 via a wire and/or via wireless communication technology), the display device 912 is, for example, an external monitor, projector, television, display screen, etc.

In various embodiments, the computing device 900 includes one, or two, or three, four, or more of each or any of the above-mentioned elements (e.g., the processors 902, memory devices 904, network interface devices 906, display interfaces 908, and user input adapters 910). Alternatively or additionally, in some embodiments, the computing device 900 includes one or more of: a processing system that includes the processors 902; a memory or storage system that includes the memory devices 904; and a network interface system that includes the network interface devices 906. Alternatively, or additionally, in some embodiments, the computing device 900 includes a system-on-a-chip (SoC) or multiple SoCs, and each or any of the above-mentioned elements (or various combinations or subsets thereof) is included in the single SoC or distributed across the multiple SoCs in various combinations. For example, the single SoC (or the multiple SoCs) may include the processors 902 and the network interface devices 906; or the single SoC (or the multiple SoCs) may include the processors 902, the network interface devices 906, and the memory devices 904; and so on. The computing device 900 may be arranged in some embodiments such that: the processors 902 include a multi or single-core processor; the network interface devices 906 include a first network interface device (which implements, for example, WiFi, Bluetooth, NFC, etc.) and a second network interface device that implements one or more cellular communication technologies (e.g., 3G, 4G LTE, CDMA, etc.); the memory devices 904 include RAM, flash memory, or a hard disk. As another example, the computing device 900 may be arranged such that: the processors 902 include two, three, four, five, or more multi-core processors; the network interface devices 906 include a first network interface device that implements Ethernet and a second network interface device that implements WiFi and/or Bluetooth; and the memory devices 904 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the (e.g., the client device that accesses the system 100 and/or on which reports 108 are displayed, the server system in which pipeline 102 is implemented and/or on which the databases are stored, etc.), each of which will be referred to individually for clarity as a "component" for the remainder of this paragraph, are implemented using an example of the computing device 900 of FIG. 9. In such embodiments, the following applies for each component: (a) the elements of the 900 computing device 900 shown in FIG. 9 (i.e., the one or more processors 902, one or more memory devices 904, one or more network interface devices 906, one or more display interfaces 908, and one or more user input adapters 910), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 904 (e.g., in various embodiments, in a volatile memory device such as a RAM or an instruction register and/or in a non-volatile memory device such as a flash memory or hard disk) and all actions described herein as performed by the software modules are performed by the processors 902 in conjunction with, as appropriate, the other elements in and/or connected to the computing device 900 (i.e., the network interface devices 906, display interfaces 908, user input adapters 910, and/or display device 912); (c) alternatively or additionally, to the extent it is described herein that the component processes and/or otherwise handles data, in some embodiments, such data is stored in the memory devices 904 (e.g., in some embodiments, in a volatile memory device such as a RAM and/or in a non-volatile memory device such as a flash memory or hard disk) and/or is processed/handled by the processors 902 in conjunction, as appropriate, the other elements in and/or connected to the computing device 900 (i.e., the network interface devices 906, display interfaces 908, user input adapters 910, and/or display device 912); (d) alternatively or additionally, in some embodiments, the memory devices 902 store instructions that, when executed by the processors 902, cause the processors 902 to perform, in conjunction with, as appropriate, the other elements in and/or connected to the computing device 900 (i.e., the memory devices 904, network interface devices 906, display interfaces 908, user input adapters 910, and/or display device 912), each or any combination of actions described herein as performed by the component and/or by any software modules described herein as included within the component.

The hardware configurations shown in FIG. 9 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 9, (e) via other hardware arrangements, architectures, and configurations, and/or via combinations of the technology described in (a) through (e).

Technical Advantages of Described Subject Matter

The following paragraphs describe technical advantages that may be realized in accordance with various embodiments discussed herein.

In certain example embodiments, methods and systems are provided that incorporate two artificial intelligence techniques, machine learning and deep learning, which have different processing capacity and time requirements and may yield results of different accuracy levels, in a single processing pipeline that is configured to take raw report data originated by different entities as input and to generate classification of that data. Combining the two different artificial intelligence techniques yields a system that can classify data, such as report data that can change among entities and over time, in an efficient (e.g., efficient processing resource capacity usage, efficient processing time usage) manner in order to generate an accurate grouping of the data into a predefined set of categories.

In some embodiments, a data structure of intermediate classification results (in some embodiments, an intermediate set of labeled questions) generated by machine learning natural language inference and an accuracy threshold testing operation cooperate to dynamically decide which of the intermediate results is to be processed using the deep learning pipeline to improve classification in the intermediate results and which of the intermediate results can be directed to the output without consuming additional deep learning processing resources. The system may be configured to dynamically adapt (e.g., throttle the number of questions being sent, increase/reduce the selection threshold for questions to be sent, etc.) the workload to the deep learning pipeline based on the overall system workload, the workload of the processors on which the deep learning pipeline is being run, any time constraints, and a level of accuracy to be provided. For example, in some embodiments, when the overall system workload and/or the workload of the processor(s) on which the deep learning pipeline is run exceeds a predetermined threshold of processor load and/or memory capacity, the threshold accuracy level for selecting questions to be sent to the deep learning processing pipeline may be automatically increased in order to throttle down, or reduce the rate of, questions being sent to the deep learning processing pipeline. In some embodiments, the rate of throttling or reduction can be controlled more granularly by defining a plurality of accuracy thresholds for selecting questions for deep learning processing and associating each accuracy threshold with respective level of workload of the processor(s) on which the deep learning pipeline is run.

The generation, by the relatively less computationally expensive (e.g., consumes less computing power and/or time) machine learning natural language inferencing, of an intermediate set of results with a confidence level associated with each intermediate result enables the use of the relatively more computationally expensive (e.g., consumes more computing power and/or time) deep learning model for multi-label classification (e.g., implemented with a neural network) for only a subset of the input data so that overall system efficiency is improved while ensuring a high level of accuracy in the classification.

Additional technical advantages embodied in the subject matter of this specification beyond those outlined above may be apparent to the skilled person.

Selected Terminology

The elements described in this document include actions, features, components, items, attributes, and other terms. Whenever it is described in this document that a given 3                                                                         24 element is present in "some embodiments," "various embodiments," "certain embodiments," "certain example embodiments, "some example embodiments," "an exemplary embodiment," "an example," "an instance," "an example instance," or whenever any other similar language is used, it should be understood that the given element is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments.

Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an", and "the" should be read as meaning "at least one," "one or more," or the like; the term "example", which may be used interchangeably with the term embodiment, is used to provide examples of the subject matter under discussion, not an exhaustive or limiting list thereof; the terms "comprise" and "include" (and other conjugations and other variations thereof) specify the presence of the associated listed elements but do not preclude the presence or addition of one or more other elements; and if an element is described as "optional," such description should not be understood to indicate that other elements, not so described, are required.

As used herein, the term "non-transitory computer-readable storage medium" includes a register, a cache memory, a ROM, a semiconductor memory device (such as D-RAM, S-RAM, or other RAM), a magnetic medium such as a flash memory, a hard disk, a magneto-optical medium, an optical medium such as a CD-ROM, a DVD, or Blu-Ray Disc, or other types of volatile or non-volatile storage devices for non-transitory electronic data storage. The term "non-transitory computer-readable storage medium" does not include a transitory, propagating electromagnetic signal.

The claims are not intended to invoke means-plus-function construction/interpretation unless they expressly use the phrase "means for" or "step for." Claim elements intended to be construed/interpreted as means-plus-function language, if any, will expressly manifest that intention by reciting the phrase "means for" or "step for"; the foregoing applies to claim elements in all types of claims (method claims, apparatus claims, or claims of other types) and, for the avoidance of doubt, also applies to claim elements that are nested within method claims. Consistent with the preceding sentence, no claim element (in any claim of any type) should be construed/interpreted using means plus function construction/interpretation unless the claim element is expressly recited using the phrase "means for" or "step for."

Whenever it is stated herein that a hardware element (e.g., a processor, a network interface, a display interface, a user input adapter, a memory device, or other hardware element), or combination of hardware elements, is "configured to" perform some action, it should be understood that such language specifies a physical state of configuration of the hardware element(s) and not mere intended use or capability of the hardware element(s). The physical state of configuration of the hardware elements(s) fundamentally ties the action(s) recited following the "configured to" phrase to the physical characteristics of the hardware element(s) recited before the "configured to" phrase. In some embodiments, the physical state of configuration of the hardware elements may be realized as an application specific integrated circuit (ASIC) that includes one or more electronic circuits arranged to perform the action, or a field programmable gate array (FPGA) that includes programmable electronic logic circuits that are arranged in series or parallel to perform the action in accordance with one or more instructions (e.g., via a configuration file for the FPGA). In some embodiments, the physical state of configuration of the hardware element may be specified through storing (e.g., in a memory device) program code (e.g., instructions in the form of firmware, software, etc.) that, when executed by a hardware processor, causes the hardware elements (e.g., by configuration of registers, memory, etc.) to perform the actions in accordance with the program code.

A hardware element (or elements) can be therefore be understood to be configured to perform an action even when the specified hardware element(s) is/are not currently performing the action or is not operational (e.g., is not on, powered, being used, or the like). Consistent with the preceding, the phrase "configured to" in claims should not be construed/interpreted, in any claim type (method claims, apparatus claims, or claims of other types), as being a means plus function; this includes claim elements (such as hardware elements) that are nested in method claims.

ADDITIONAL APPLICATIONS OF DESCRIBED
SUBJECT MATTER

Although process steps, algorithms or the like, including without limitation with reference to FIGS. 1 and 2, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A system comprising:

at least one memory comprising:

a database of reports, each report comprising a plurality of report sections, wherein each report section of the plurality of report sections comprises at least one question and a corresponding response;

a machine-learned model; and a deep-learning model; and at least one processor configured to perform operations comprising:

receiving as input a plurality of predetermined report section titles and a list of questions extracted from the database of reports;

generating, using the machine-learned model and the received input, an intermediate set of labeled questions by:

assigning, to each question in the list of questions, a respective probability score associated with each title in the plurality of predetermined report section titles; and selecting, for each question in the list of questions, an associated predetermined title based on the assigned probability scores, wherein each labeled question in the intermediate set of labeled questions comprises a question from the list of questions and the selected predetermined title associated with the question;

selecting at least a portion of the generated intermediate set of labeled questions to be provided as input to the deep learning model;

using the selected at least portion of the generated intermediate set of labeled questions as input to the deep learning model, repeatedly processing respective labeled questions in the deep learning model until an accuracy threshold is satisfied for the respective labeled questions;

generating a final set of labeled questions, wherein each labeled question in the final set satisfies the accuracy threshold; and outputting aggregated labeled questions of the final set of labeled questions based on the predetermined report section titles.

2. The system according to claim 1, wherein the selecting at least a portion of the generated intermediate set of labeled questions to be provided as input to the deep learning model, comprises:

dynamically adapting which of the respective labeled questions are included in the selected at least portion by changing a threshold value for selecting the respective labeled questions.

3. The system according to claim 1, wherein the repeatedly processing comprises repeatedly providing a question from the set of intermediate results as input to a neural network configured in accordance with the deep learning model.

4. The system according to claim 1, wherein the generating, using the machine-learned model and the received input, an intermediate set of labeled questions comprises using zero shot learning (ZSL) to generate the intermediate set of labeled questions.

5. The system according to claim 4, wherein the using at least a portion of the generated intermediate set of labeled questions as input to the deep learning model, repeatedly processing respective labeled questions until an accuracy threshold is satisfied for respective labeled questions comprises using Bidirectional Encoder Representations from Transformers (BERT) in association with the deep learning model during the repeatedly processing.

6. The system according to claim 1, wherein the repeatedly processing respective labeled questions until an accuracy threshold is satisfied for respective labeled questions comprises regenerating the respective labeled questions by the deep learning model.

7. The system according to claim 6, wherein the repeatedly processing respective labeled questions until an accuracy threshold is satisfied for respective labeled questions further comprises comparing the regenerated respective labeled questions to the accuracy threshold.

8. The system according to claim 7, wherein the comparing is performed by a human operator.

9. The system according to claim 1, wherein the outputting aggregated labeled questions of the final set of labeled questions comprises at least one of (1) determining comparative performance metrics for respective ones of the predetermined report section titles for a particular entity and for all entities, or (2) determining comparative performance metrics for respective ones of the predetermined report section titles for a particular entity for two or more time periods.

10. The system according to claim 1, wherein the operations further comprise preprocessing the list of questions, wherein the list of questions extracted from the database of reports comprises a plurality of lines of text, wherein each line of text includes at least a report section title and a question, each of which is extracted from a report, and wherein the preprocessing comprises removing the report section title from said each line of text.

11. The system according to claim 1, wherein the generated labeled questions each comprises a predefined report section title concatenated with a question from the list of the questions, wherein the predefined report section title is one of the plurality of predetermined report section titles.

12. The system according to claim 1, wherein the generating, using the machine-learned model and the received input, an intermediate set of labeled questions comprises:

sequence embedding for respective questions from the list of questions;

performing classification for respective sequence embedded questions;

generating probabilities for respective sequence classified questions; and selecting the intermediate set of labeled questions from sequence classified questions in accordance to the associated generated probabilities.

13. A method comprising:

receiving as input, by at least one processor, a plurality of predetermined report section titles and a list of questions extracted from a database of reports stored in at least one memory, wherein in the database of reports, each report comprising a plurality of report sections, wherein each report section of the plurality of report sections comprises at least one question and a corresponding response;

generating, by the at least one processor and using a machine-learned model and the received input, an intermediate set of labeled questions by:

assigning, to each question in the list of questions, a respective probability score associated with each title in the plurality of predetermined report section titles; and selecting, for each question in the list of questions, an associated predetermined title based on the assigned probability scores, wherein each labeled question in the intermediate set of labeled questions comprises a question from the list of questions and the selected predetermined title associated with the question;

selecting, by the at least one processor, at least a portion of the generated intermediate set of labeled questions to be provided as input to the deep learning model;

using the selected at least portion of the generated intermediate set of labeled questions as input to a deep learning model, repeatedly processing respective labeled questions by the at least one processor in the deep learning model until an accuracy threshold is satisfied for the respective labeled questions;

generating a final set of labeled questions by the at least one processor, wherein each labeled question in the final set satisfies the accuracy threshold; and outputting, by the at least one processor, aggregated labeled questions of the final set of labeled questions based on the predetermined report section titles.

14. The method according to claim 13, wherein the selecting at least a portion of the generated intermediate set of labeled questions to be provided as input to the deep learning model, comprises:

dynamically adapting which of the respective labeled questions are included in the selected at least portion by changing a threshold value for selecting the respective labeled questions.

15. The method according to claim 14, wherein the dynamically adapting is performed in accordance with a probability score associated with each of the labeled questions of the intermediate set of labeled questions.

16. The method according to claim 15, wherein the repeatedly processing comprises repeatedly providing a question from the set of intermediate results as input to a neural network configured in accordance with the deep learning model.

17. A non-transitory computer readable storage medium storing instructions that, when executed by at least one processor of a computer system, causes the computer system to perform operations comprising:

receiving as input a plurality of predetermined report section titles and a list of questions extracted from a database of reports stored in a memory, wherein in the database of reports, each report comprising a plurality of report sections, wherein each report section of the plurality of report sections comprises at least one question and a corresponding response;

generating, using a machine-learned model and the received input, an intermediate set of labeled questions by:

assigning, to each question in the list of questions, a respective probability score associated with each title in the plurality of predetermined report section titles; and selecting, for each question in the list of questions, an associated predetermined title based on the assigned probability scores, wherein each labeled question in the intermediate set of labeled questions comprises a question from the list of questions and the selected predetermined title associated with the question;

selecting at least a portion of the generated intermediate set of labeled questions to be provided as input to the deep learning model;

using the selected at least portion of the generated intermediate set of labeled questions as input to a deep learning model, repeatedly processing respective labeled questions in the deep learning model until an accuracy threshold is satisfied for the respective labeled questions;

generating a final set of labeled questions, wherein each labeled question in the final set satisfies the accuracy threshold; and outputting aggregated labeled questions of the final set of labeled questions based on the predetermined report section titles.

18. The non-transitory computer readable storage medium according to claim 17, wherein the selecting at least a portion of the generated intermediate set of labeled questions to be provided as input to the deep learning model, comprises:

dynamically adapting which of the respective labeled questions are included in the selected at least portion by changing a threshold value for selecting the respective labeled questions.

* * * * *